(12) United States Patent
Senzaki et al.

(10) Patent No.: US 9,135,685 B2
(45) Date of Patent: Sep. 15, 2015

(54) IMAGE PROCESSING METHOD AND IMAGE PROCESSING DEVICE

(71) Applicant: NEC Corporation, Tokyo (JP)

(72) Inventors: Kenta Senzaki, Tokyo (JP); Masato Tsukada, Tokyo (JP); Hiroaki Kawaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/397,381

(22) PCT Filed: Apr. 24, 2013

(86) PCT No.: PCT/JP2013/061968
§ 371 (c)(1),
(2) Date: Oct. 27, 2014

(87) PCT Pub. No.: WO2013/161838
PCT Pub. Date: Oct. 31, 2013

(65) Prior Publication Data
US 2015/0086130 A1    Mar. 26, 2015

(30) Foreign Application Priority Data

Apr. 26, 2012   (JP) ................................. 2012-100909

(51) Int. Cl.
*G06T 5/00* (2006.01)
*G06T 5/20* (2006.01)

(52) U.S. Cl.
CPC . *G06T 5/002* (2013.01); *G06T 5/20* (2013.01); *G06T 2207/20016* (2013.01); *G06T 2207/20192* (2013.01)

(58) Field of Classification Search
USPC .......................... 382/225, 260, 266, 274, 275
See application file for complete search history.

(56) References Cited

U.S. PATENT DOCUMENTS

2002/0076118 A1    6/2002   Kaji

FOREIGN PATENT DOCUMENTS

| JP | 2002-057900 | 2/2002 |
|---|---|---|
| JP | 2002-183727 | 6/2002 |
| JP | 2007-018379 | 1/2007 |
| JP | 2011-041183 | 2/2011 |

OTHER PUBLICATIONS

International Search Report, PCT/JP2013/061968, Jul. 16, 2013.

*Primary Examiner* — Duy M Dang
(74) *Attorney, Agent, or Firm* — Young & Thompson

(57) ABSTRACT

A method includes: calculating a pixel statistical value and edge of pixels for each of areas of a multi-layer, the areas each containing a target pixel and having a successively decreased range; correcting the edge based on a pixel statistical value of an area that is wider than an area of a specific layer; correcting difference between a pixel statistical value of the specific layer and the pixel statistical value of a layer that is wider than the specific layer using the post-correction edge; correcting the pixel statistical value of the specific layer using post-correction difference and the pixel statistical value of the layer that is wider than the specific layer; and correcting the target pixel by repeating correction of the pixel statistical value successively in each layer until the area reduces its range from the maximum range to the minimum range.

19 Claims, 7 Drawing Sheets

(a)

(b)

IMAGE PROCESSING METHOD AND IMAGE PROCESSING DEVICE

TECHNICAL FIELD

The present invention relates to an image processing method and an image processing device.

BACKGROUND ART

In the image processing technology, specifically, a technology for reducing random noise contained in an image is essential to sharp reproduction of a captured image. A typical technology for reducing random noise is disclosed in Patent Literature 1.

Patent Literature 1 discloses the following technology. That is, an apparatus includes a plurality of arithmetic circuits for calculating a moving average pixel number (n) based on a specified mathematical formula with respect to an arbitrary target pixel (i) in a main scanning direction of a color digital signal output from an input image processing circuit, a plurality of bit selector circuits for selectively outputting the target pixel (i) and reference pixels (j) preceding and following (n) pixels, a plurality of difference circuits for calculating absolute values of the differences between an output level of the target pixel (i) and an output level of each of the reference pixels (j), a plurality of judging circuits for outputting the target pixel (i), comparing the values output from the plurality of difference circuits with a specified threshold in a threshold memory, to output the reference pixels (j) based on the comparison result, and a plurality of arithmetic circuits for performing the moving average processing of output signals from the plurality of judging circuits.

More specifically, only in a case where an absolute value of a difference between an output level of the target pixel (i) and an output level of the reference pixel (j) is equal to or less than a threshold, the reference pixel (j) is added to the moving average processing. As a result, a portion where the absolute value of the difference varies sharply over the threshold is excluded from the moving average processing. This ensures effective removal of noise components.

CITATION LIST

Patent Literature

[Patent Literature 1]
Japanese Unexamined Patent Application, First Publication No. 2002-57900

SUMMARY OF INVENTION

Technical Problem

However, with the technology of the Patent Literature 1, it was impossible to remove low frequency noise with periodicity equal to or more than a size of a smoothing filter.

Specifically, it was impossible to realize both of the preservation of an edge in a low-brightness region in the image and effective removal of a noise in an image at the same time.

In the light of the above, the present invention was made to solve the above described problem. The purpose of the present invention is to provide an image processing method capable of preserving an edge in a low-brightness region in an image as well as effectively removing a noise in the image and image processing device.

Solution to Problem

The present invention is directed to an image processing method including: calculating a pixel statistical value and edge information of pixels for each of areas of a multi-layer, the areas each containing a target pixel and having a successively decreased range; correcting the edge information based on a pixel statistical value of an area that is wider than an area of a specific layer; correcting difference information between a pixel statistical value of the area of the specific layer and the pixel statistical value of the area of a layer that is wider than the area of the specific layer using the post-correction edge information; correcting the pixel statistical value of the area of the specific layer using post-correction difference information and the pixel statistical value of the area that is wider than the area of the specific layer; and correcting the target pixel by repeating correction of the pixel statistical value of the area of the specific layer successively in each layer until the area reduces its range from the maximum range to the minimum range.

The present invention is directed to an image processing device including: a pixel statistical value calculation unit calculating a pixel statistical value of pixels for each of areas of a multi-layer, the areas each containing a target pixel and having a successively decreased range; an edge information calculation unit calculating edge information for each of the areas of the multi-layer, the areas each containing a target pixel and having a successively decreased range; an edge information correction unit correcting the edge information based on a pixel statistical value of an area that is wider than an area of a specific layer; and a correction unit correcting difference information between a pixel statistical value of the area of the specific layer and a pixel statistical value of the area of a layer that is wider than the area of the specific layer using post-correction edge information, correcting the pixel statistical value of the area of the specific layer using post-correction difference information and the pixel statistical value of the area that is wider than the area of the specific layer, and correcting the target pixel by repeating correction of the pixel statistical value of the area of the specific layer successively in each layer until the area reduces its range from the maximum range to the minimum range.

Advantageous Effect of Invention

According to an aspect of the present invention, it is possible to preserve an edge in a low-brightness region in an image as well as to remove noise effectively.

DESCRIPTION OF EMBODIMENTS

<First Embodiment>

A first embodiment of the present invention will be described below.

Figure 1:
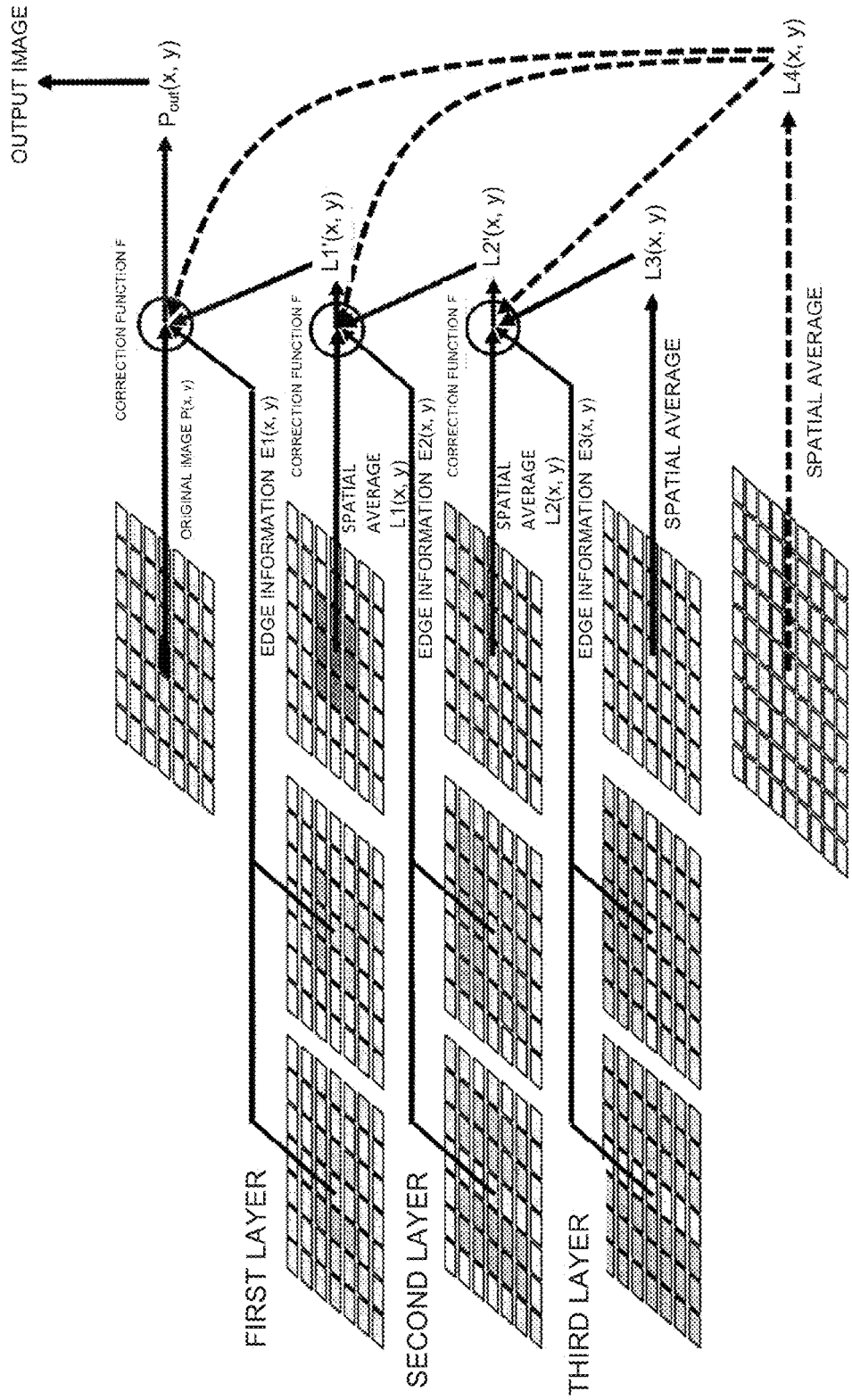
FIG. 1 illustrates an image processing method according to a first embodiment of the present invention.

FIG. 1 illustrates an image processing method according to the first embodiment of the present invention. FIG. 1 illustrates a flow of multi-resolution image processing carried out in a three-layer structure. However, it is possible to achieve the present invention by multi-resolution image processing carried out in a two-layer structure. It is further possible to achieve the present invention by multi-resolution image processing carried out in a four-or-more-layer structure with ease.

In the first embodiment of the present invention, a spatial average (L2 (x, y)) in an medium area is corrected based on the Weber's law using a spatial average L3 (x, y) as a pixel statistical value of a space in a wide area in which a pixel location (x, y) (target pixel) is centered, edge information in the wide area or an edge amount E3 (x, y) in the wide area, and a spatial average L4 (x, y) as a pixel statistical value of a space that has a range wider than the wide area. Subsequently, a spatial average (L1 (x, y)) of a narrow area is corrected using a post-correction spatial average (L2' (x, y)) in the medium area, an edge amount (E2 (x, y)) in the medium area, and the spatial average L4 (x, y). Sequential processing of these corrections ensures correction of an input pixel value $P_{in}$ (x, y). Further, this ensures obtainment of an output pixel value $P_{out}$ (x, y).

Here, the pixel statistical value is a spatial average of a target area. Examples of the spatial average include an arithmetic mean, a geometric mean, and a weighted average efficiency of pixels existing in areas. Given that the pixel statistical value is a spatial average, in the following description, a case where the spatial average is the arithmetic mean of pixels in areas will be described below. Further, the edge amount or the edge information is to be defined by a difference value of the statistic amounts (e.g., mean values and medians) of pixels between areas, the pixels being respectively positioned upward, downward, left-side, and right-side of the target pixel (input pixel). In the following description, similar to the pixel statistical value, a case where the edge amount is a difference between the spatial averages will be described.

A specific description will be made below. In FIG. 1, flows of processing at respective layers are identical to each other except for a parameter for calculating a correction amount. As an example, processing for correcting the spatial average L2 (x, y) in the medium area will be described below in detail using the spatial average L3 (x, y) in the wide area, the edge amount E3 (x, y) in the wide area, and the spatial average L4 (x, y) as a pixel statistical value of an area having a range that is wider than the wide area.

Initially, the spatial average L3 (x, y) of the wide area (range between −k3 and k3) and the spatial average L2 (x, y) of the medium area (range between −k2 and k2) at each pixel location (x, y) are calculated according to a formula (1) and a formula (2), respectively. Here, a range of each of the wide area and the medium area is designated by the respective same pixel numbers in a vertical axis and a horizontal axis, i.e., designated by k3 and k2, respectively. However, the pixel numbers are not necessarily the same in the vertical axis and the horizontal axis.

$$L3(x, y) = \frac{1}{(2 \cdot k3 + 1)^2} \sum_{i=-k3}^{k3} \sum_{j=-k3}^{k3} P_{in}(x+i, y+j) \quad (1)$$

$$L2(x, y) = \frac{1}{(2 \cdot k2 + 1)^2} \sum_{i=-k2}^{k2} \sum_{j=-k2}^{k2} P_{in}(x+i, y+j) \quad (2)$$

Next, the edge amount E3 (x, y) in the wide area will be calculated. In the calculation of the edge amount, an edge amount EV3 (x, y) in the vertical direction and an edge amount EH3 (x, y) in the horizontal direction are calculated according to a formula (3) and a formula (4), respectively. Resulting values are added according to a formula (5) to calculate the edge amount E3 (x, y) in the wide area. Here, the range of the wide area is designated by the same pixel numbers, e.g., k3, in the vertical axis and the horizontal axis. However, it is not essential to designate the range by the same pixel numbers in the vertical axis and the horizontal axis.

$$EV3(x, y) = \frac{1}{(2 \cdot k3 + 1) \cdot k3} \left| \sum_{i=-k3}^{k3} \sum_{j=1}^{k3} (P_{in}(x+i, y+j) - P_{in}(x+i, y-j)) \right| \quad (3)$$

$$EH3(x, y) = \frac{1}{(2 \cdot k3 + 1) \cdot k3} \left| \sum_{i=1}^{k3} \sum_{j=-k3}^{k3} (P_{in}(x+i, y+j) - P_{in}(x-i, y+j)) \right| \quad (4)$$

$$E3(x, y) = EV3(x, y) + EH3(x, y) \quad (5)$$

Subsequently, in the present embodiment, a spatial average (L2 (x, y)) in the medium area is corrected based on the Weber's law using the spatial average L4 (x, y).

Figure 2:
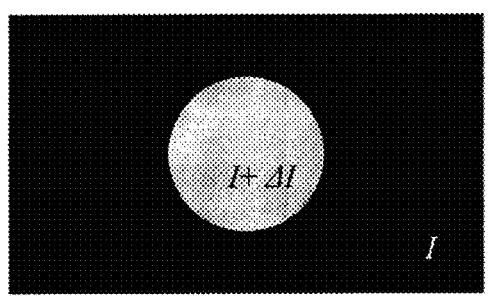
FIG. 2 includes illustrations for illustrating the Weber's law.
Figure 2:
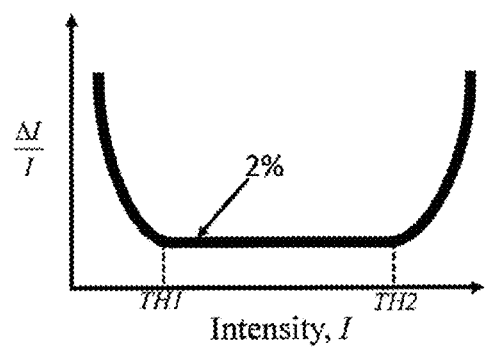

Here, FIG. 2 includes graphs for illustrating the Weber's law. In FIG. 2(*a*), a brightness value of a background region is represented by I, and a brightness value of a foreground region is represented by I+ΔI. Under the above circumstance, the following formula (6) is true with respect to the minimum threshold (differential threshold) ΔI that can discriminate the foreground from the background, except for a case where I shows extremely low brightness (equal to or less than TH1 in FIG. 2) or a case where I shows extremely high brightness (equal to or less than TH2 in FIG. 2).

$$\frac{\Delta I}{I} = \text{CONSTANT} \quad (6)$$

FIG. 2(*b*) is a graph illustrating the formula (6). In FIG. 2(*b*), the vertical axis shows a value ΔI/I, the horizontal axis shows a value I, and a curved line shows values capable of discriminating the foreground from the background. Non-patent Literature 1 discloses a value ΔI/I of about 0.02. For example, in a case where the background brightness values 100 and 200 exist between TH1 and TH2, it is possible to sense a boundary by the foreground brightness value 102 (ΔI=2) in an area of the background brightness value 100; however, it is impossible to sense the boundary similarly by the foreground brightness value 202 (ΔI=2) in an area of the background brightness value 200. (i.e., The value should be ΔI=4 for discriminating the boundary in the area of the background brightness value 200.)

NON PATENT LITERATURE 1: W. K. Pratt, Digital Image Processing. New York: Wiley, 1978. The present embodiment employs edge/flatness/texture determination based on the Weber's law.

Turning back to the explanation of the processing in each layer, in the present embodiment, the edge amount is calculated according to a brightness value of an area that contains a target pixel using the spatial average L4 (x, y) and the two thresholds TH1 and TH2 illustrated in FIG. 2. An example of the spatial average L4 (x, y) (arithmetic mean) is shown in a formula (7). Here, the area having the range wider than the wide area is designated by the same pixel numbers, i.e., k4, in the vertical axis and the horizontal axis. However, it is not essential to employ the same pixel numbers in the vertical axis and the horizontal axis.

$$L4(x, y) = \frac{1}{(2 \cdot k4 + 1)^2} \sum_{i=-k4}^{k4} \sum_{j=-k4}^{k4} P_{in}(x+i, y+j) \quad (7)$$

Here, k4>=k3 is true.

An exemplary edge amount of the present embodiment is set according to the following formula (8).

$$E3'(x, y) = \begin{cases} E3(x, y) & \text{if } L4(x, y) \leq TH1 \text{ or } L4(x, y) \geq TH2 \\ \frac{E3(x, y)}{L4(x, y)} & \text{otherwise} \end{cases} \quad (8)$$

The formula (8) shows that a relative edge amount E3' (x, y) obtained in such a manner that the absolute edge amount E3 (x, y) is normalized by the spatial average L4 (x, y) is used in the brightness area satisfying the Weber's law, whereas, the absolute edge amount E3 (x, y) is used in the brightness area unsatisfying the Weber's law.

Subsequently, the spatial average L3 (x, y) in the wide area is corrected using a composed weight α3' (x, y) that is calculated based on the edge amount E3' (x, y), thereby obtaining a post-correction spatial average L3" (x, y) of the wide area. An exemplary calculation is shown in formula (9). The composed weight α3' (x, y) is calculated, for example, according to a formula (10) using thresholds hi3' and lo3'.

$$L3''(x, y) = (1 - \alpha 3'(x, y)) \cdot L3(x, y) + \alpha 3'(x, y) \cdot L2(x, y) \quad (9)$$

$$\alpha 3'(x, y) = \begin{cases} 1.0 & \text{if } E3'(x, y) > hi3' \\ 0.0 & \text{else if } E3'(x, y) < lo3' \\ \frac{E3'(x, y) - lo3'}{hi3' - lo3'} & \text{else} \end{cases} \quad (10)$$

Here, the threshold parameters hi3' and lo3' are set in advance for each of the following three patterns:
(1) a case where L4 (x, y)<TH1,
(2) a case where L4 (x, y)>TH2, and
(3) a case other than the above cases.
In the formula (10), each corresponding parameter is used based on the spatial average L4 (x, y).

The method for calculating the edge amount according to the formula (8) based on the Weber's law contributes to more precise determination of an edge (E3' (x, y)>hi3'), flatness (E3' (x, y)<lo3'), and texture (other than the above) in the formula (10).

Finally, the spatial average L2 (x, y) of the medium area is corrected according to a formula (11) using thus obtained spatial average L3".

$$L2'(x,y)=L3''(x,y)+\text{Func}(L2(x,y)-L3''(x,y)) \quad (11)$$

Figure 3:
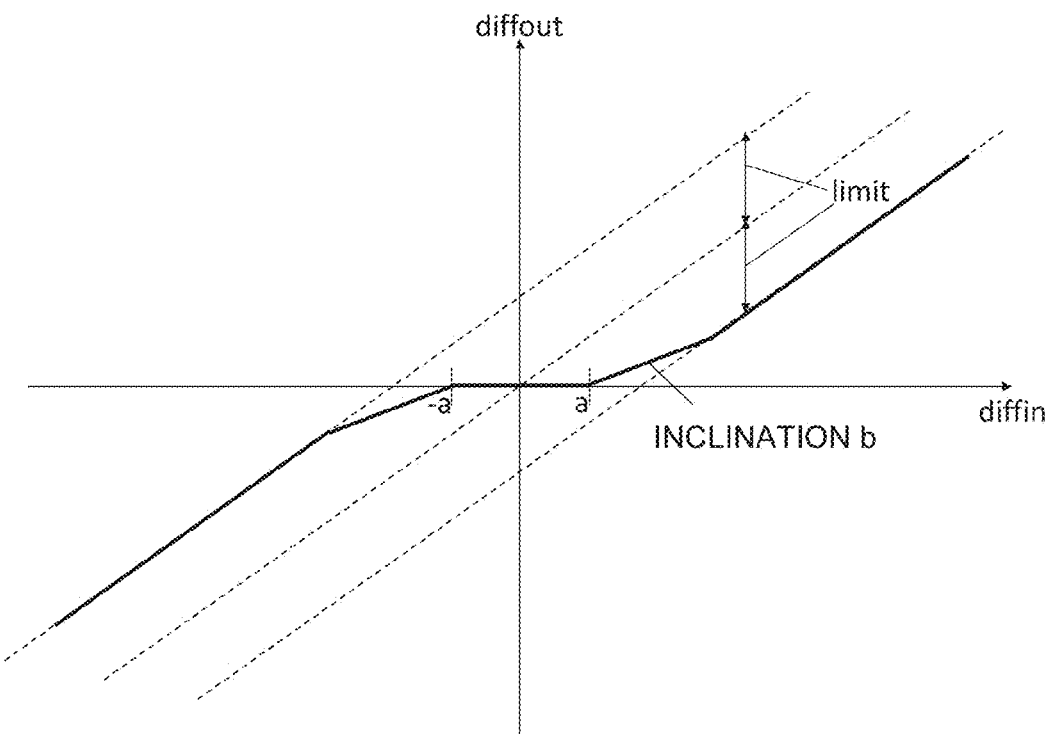
FIG. 3 illustrates an example of the Func function.

FIG. 3 shows an example of a correction function Func. For example, the correction of the spatial average L2 (x, y) of the medium area at the pixel location (x, y) is carried out, provided that the diffin is (L2 (x, y)–L3" (x, y)), by adding a correction amount diffout that is obtained according to the correction function of FIG. 3 to the L3" (x, y). Parameters a, b, and limit within the correction function of FIG. 3 are determined for each of the layers (resolutions) to be processed and for each of the color components to be corrected.

As described above, in the first embodiment, extraction of the edge information and control of the correction amount in the noise suppression are carried out based on the Weber's law. Use of the image processing method according to the first embodiment realizes suppression of rounding (blur) of edge without degrading the noise rejection performance.

Next, an image processing device according to the first embodiment will be described below.

Figure 4:
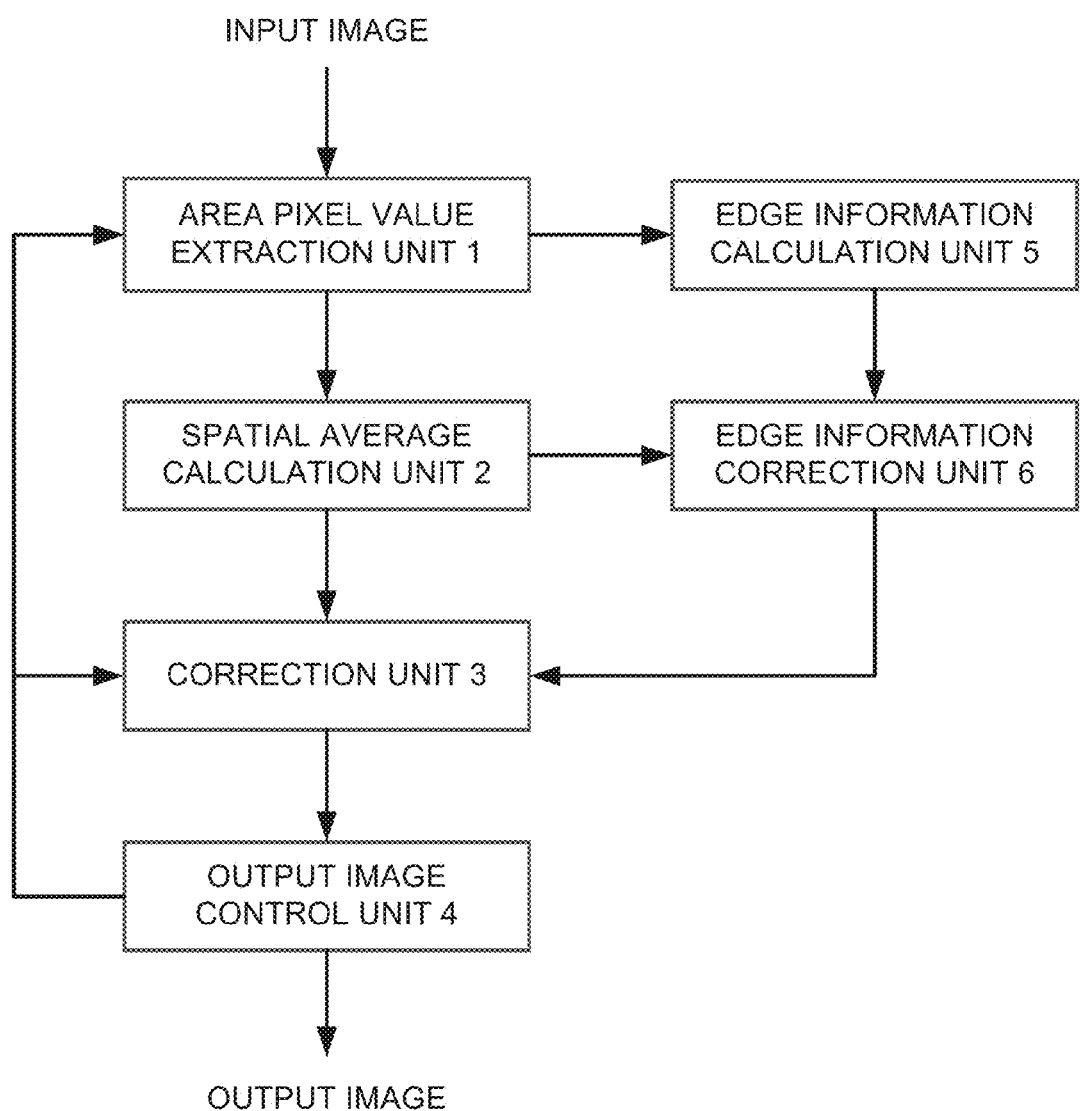
FIG. 4 is a block diagram illustrating an image processing device according to the first embodiment.

FIG. 4 is a block diagram illustrating an image processing device according to the first embodiment.

The image processing device according to the first embodiment includes an area pixel value extraction unit 1, a spatial average calculation unit 2, a correction unit 3, an output image control unit 4, an edge information calculation unit 5, and an edge information correction unit 6.

The area pixel value extraction unit 1 extracts the pixel values of pixels existing in the wide area, pixel values of pixels existing in the medium area, pixel values of pixels existing in the narrow area, pixel values of pixels existing in the area having a range wider than the wide area, each area including the pixel location (x, y) (target pixel) at a center thereof, and a pixel value of the input pixel value P_{in} (x, y) (target pixel) at their respective timings The resulting values are output to the spatial average calculation unit 2 and the edge information calculation unit 5.

The spatial average calculation unit 2 receives the pixel values of each area from the area pixel value extraction unit 1 and calculates the spatial average of each area. Then, the calculated spatial averages of the wide area, the medium area, and the narrow area are output to the correction unit 3. The spatial average of the area wider than the wide area is output to the edge information correction unit 6.

The edge information calculation unit 5 calculates the edge amount E3 (x, y) in the wide area based on the pixel values of the pixels existing in the wide area, the pixel values being from the area pixel value extraction unit 1. The edge information calculation unit 5 calculates the edge amount in such a manner that the edge amount EV3 (x, y) in the vertical direction and the edge amount EH3 (x, y) in the horizontal direction are calculated according to the formula (3) and the formula (4), respectively, and adds the resulting values according to the formula (5). Accordingly, the edge information calculation unit 5 calculates the edge amount E3 (x, y) in the wide area. Similarly, edge information calculation unit 5 calculates an edge amount E2 (x, y) of the medium area and an edge amount E1 (x, y) of the narrow area.

The edge information correction unit 6 corrects the edge amount E3 (x, y) in the wide area according to the formula (8) using the spatial average L4 (x, y) calculated by the spatial average calculation unit 2 and the two thresholds TH1 and TH2 shown in FIG. 2, the edge amount E3 (x, y) being calculated by the edge information calculation unit 5. As a result, a post-correction edge amount E3' (x, y) is obtained.

Similarly, the edge information correction unit 6 corrects the edge amount E2 (x, y) of the medium area and the edge amount E1 (x, y) of the narrow area.

The correction unit 3 calculates the composed weight α3' obtainable from the edge amount E3' (x, y) that was calculated by the edge information correction unit 6 according to the formula (10). Then, the correction unit 3 corrects the spatial average L3 (x, y) in the wide area according to the formula (9) using the composed weight α3' to thereby obtain the post-correction spatial average L3" (x, y) of the wide area.

Further, the correction unit 3 corrects the spatial average L2 (x, y) of the medium area according to the formula (11) using the calculated spatial average L3 " (x, y). Further, the correction unit 3 corrects the spatial average L1 (x, y) and the input pixel value $P_{in}$ (x, y) in a similar manner.

The output image control unit 4 instructs the area pixel value extraction unit 1 to extract pixel values of pixels of an area of the next layer each sequential time when the corrected spatial average is input. Further, each time the corrected spatial average is input, the output image control unit 4 feeds back the value to the correction unit 3. Then, when the $P_{out}$ (x, y) of a single pixel is input, the output image control unit 4 outputs the $P_{out}$ (x, y) as an output pixel value.

According to the first embodiment, the employment of the edge/flatness/texture determination based on the Weber's law achieves the sequential correction of the pixel statistical values from a pixel statistical value in an area having a wide range to a pixel statistical value in an area having a narrower range. This ensures effective noise rejection throughout a range from the high frequency noise to the low frequency noise without inviting blur of edge and/or texture.

<Second Embodiment>

A second embodiment of the present invention will be described below.

Figure 5:
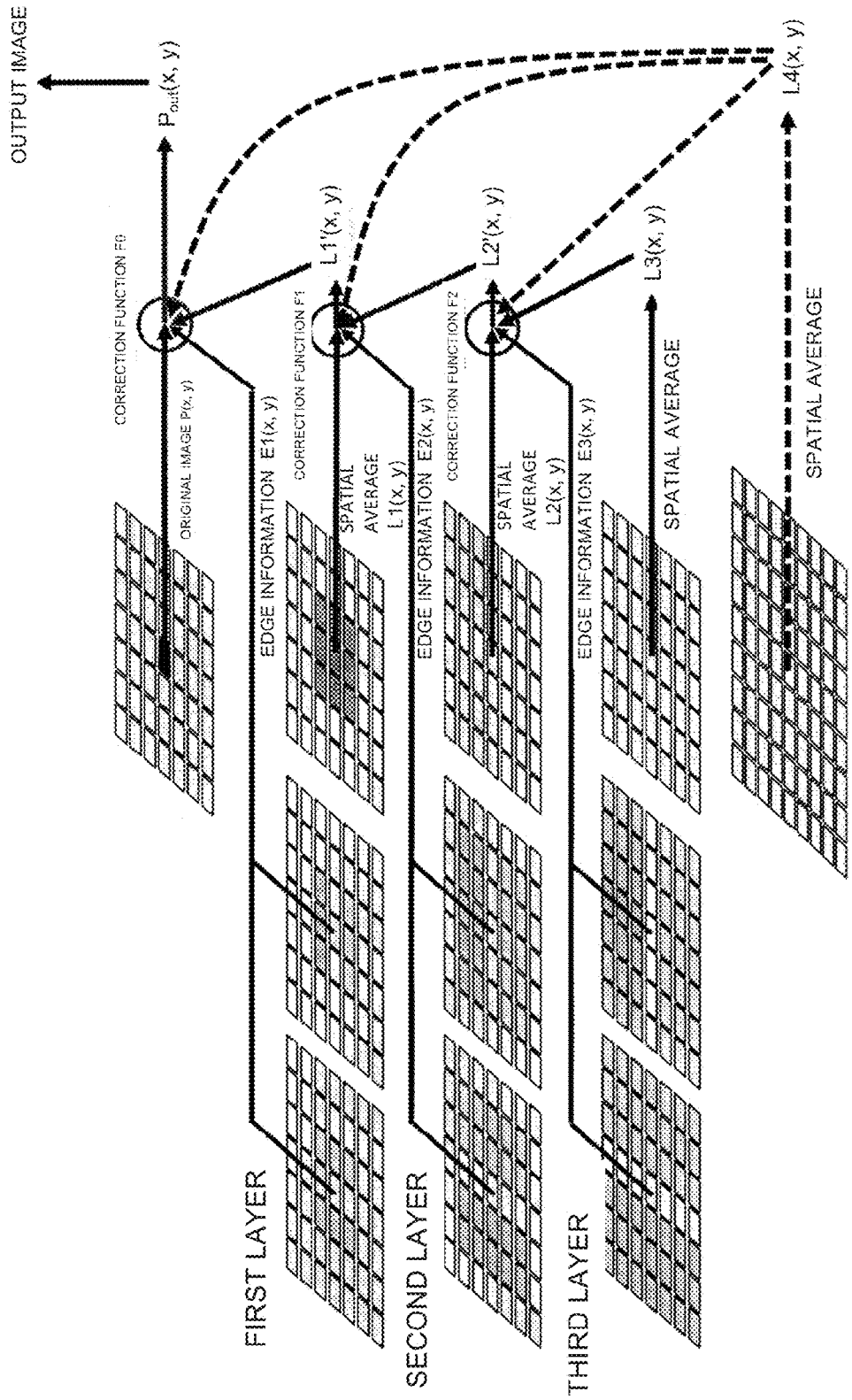
FIG. 5 illustrates an image processing method according to a second embodiment of the present invention.

FIG. 5 illustrates an image processing method according to a second embodiment of the present invention.

In the second embodiment as shown in FIG. 5, the edge amount calculated in each layer according to the formula (8) based on the Weber's law is reflected to the Func function (correction function) that suppresses noise components. This ensures adaptive suppression of the noise components of each layer.

Flows of processing at respective layers are identical to each other except for a difference of a parameter for calculating the correction amount. An example of the processing for correcting the spatial average L2 (x, y) in the medium area will be described below in detail using the spatial average L3 (x, y) in the wide area, the edge amount E3 (x, y) in the wide area, and the spatial average L4 (x, y) as the space pixel statistical value of an area having a range wider than the wide area.

In the second embodiment, a parameter (a) of the Func function illustrated in FIG. 3 is calculated using the edge amount E3' (x, y) of the wide area, the edge amount being calculated according to the formula (8) based on the Weber's law. A method for calculating the parameter (a) will be described below.

Now, a coefficient β3' (x, y) is defined according to the edge amount E3' (x, y), the coefficient being an exemplary coefficient that varies as shown in the below described formula (12).

$$\beta 3'(x, y) = \begin{cases} 0.0 & \text{if} \quad E3'(x, y) > hi3' \\ 1.0 & \text{else if} \quad E3'(x, y) < lo3' \\ \frac{E3'(x, y) - lo3'}{hi3' - lo3'} & \text{else} \end{cases} \quad (12)$$

Here, the threshold parameters hi3' and lo3' are set in advance in cases of the below mentioned three patterns:
(1) a case where L4 (x, y)<TH1;
(2) a case where L4 (x, y)>TH2; and
(3) a case other than the above cases.

In the formula (12), an appropriate parameter is used based on the spatial average L4 (x, y). The threshold parameters hi3' and lo3' in the formula (12) may be the same value as those of the formula (10). Alternatively, they may be different from those of the formula (10).

The method for calculating the edge amount according to the formula (8) based on the Weber's law makes it more precise to determine the edge (E3'(x, y)>hi3'), the flatness (E3' (x, y)<lo3'), and the texture (other than the above) in the formula (12).

The coefficient β3' (x, y) defined by the formula (12) becomes a real number within a range between 0 and 1.0. The parameter (a) in the Func function shown in FIG. 3 is set according to the following formula (13) using the coefficient β3' (x, y).

$$a = \beta 3'(x,y) \times a\_lo3 + (1 - \beta 3'(x,y)) \times a\_hi3 \quad (13)$$

Figure 6:
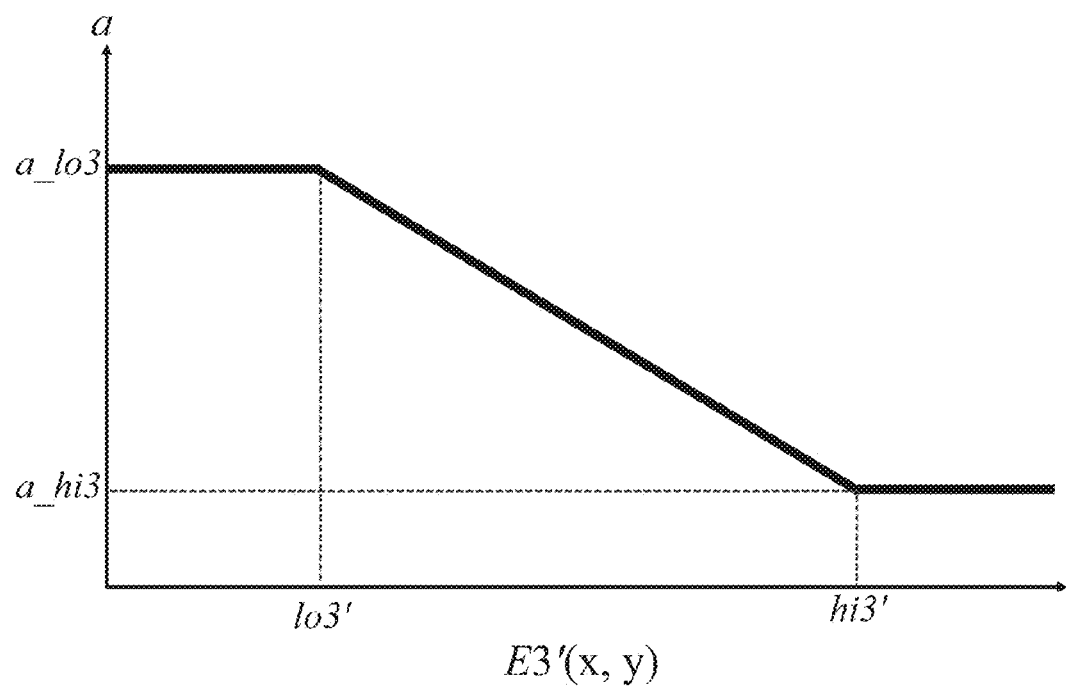
FIG. 6 illustrates an exemplary setting of a parameter (a') in a wide area according to the second embodiment.

Here, a_lo3 is a value to be used as the parameter (a) when the edge amount E3' (x, y) is smaller than the threshold lo3', and a_hi3 is a value to be used as the parameter (a) when the edge amount E3' (x, y) becomes larger than the threshold hi3'. In a case where the edge amount E3' (x, y) is within a range between the threshold lo3 and the threshold hi3, the parameter (a) becomes a value within a range between a_hi3 and a_lo3. Here, a_hi3 is a real number equal to or more than 0, and a_lo3 is a real number that satisfies a relationship of a_lo3 >=a_hi3. A relationship between the edge amount E3' (x, y) and the parameter (a) according to the formula (13) will be illustrated in FIG. 6. Meanwhile, the relationship between the edge amount E3' (x, y) and the parameter (a) will not be limited to this.

The Func function reflects the parameter (a) of the formula (13). The Func function is applied to the difference between the spatial average L3 (x, y) in the wide area and the spatial average L2 (x, y) in the medium area according to the following formula (14). The resulting value is added to the spatial average L3 (x, y). Then, the finally obtained value is output as a correction value L2' (x, y) of the spatial average L2 (x, y) in the medium area.

$$L2'(x,y) = L3(x,y) + \text{Func}(L2(x,y) - L3(x,y)) \quad (14)$$

As described above, in the second embodiment, extraction of the edge information and control of the correction amount in noise suppression are performed based on the Weber's law. Use of the method for processing the image according to the second embodiment ensures preservation of the noise rejection performance as well as the suppression of the rounding (blur) of the edge.

An image processing device according to the second embodiment will be described below.

Figure 7:
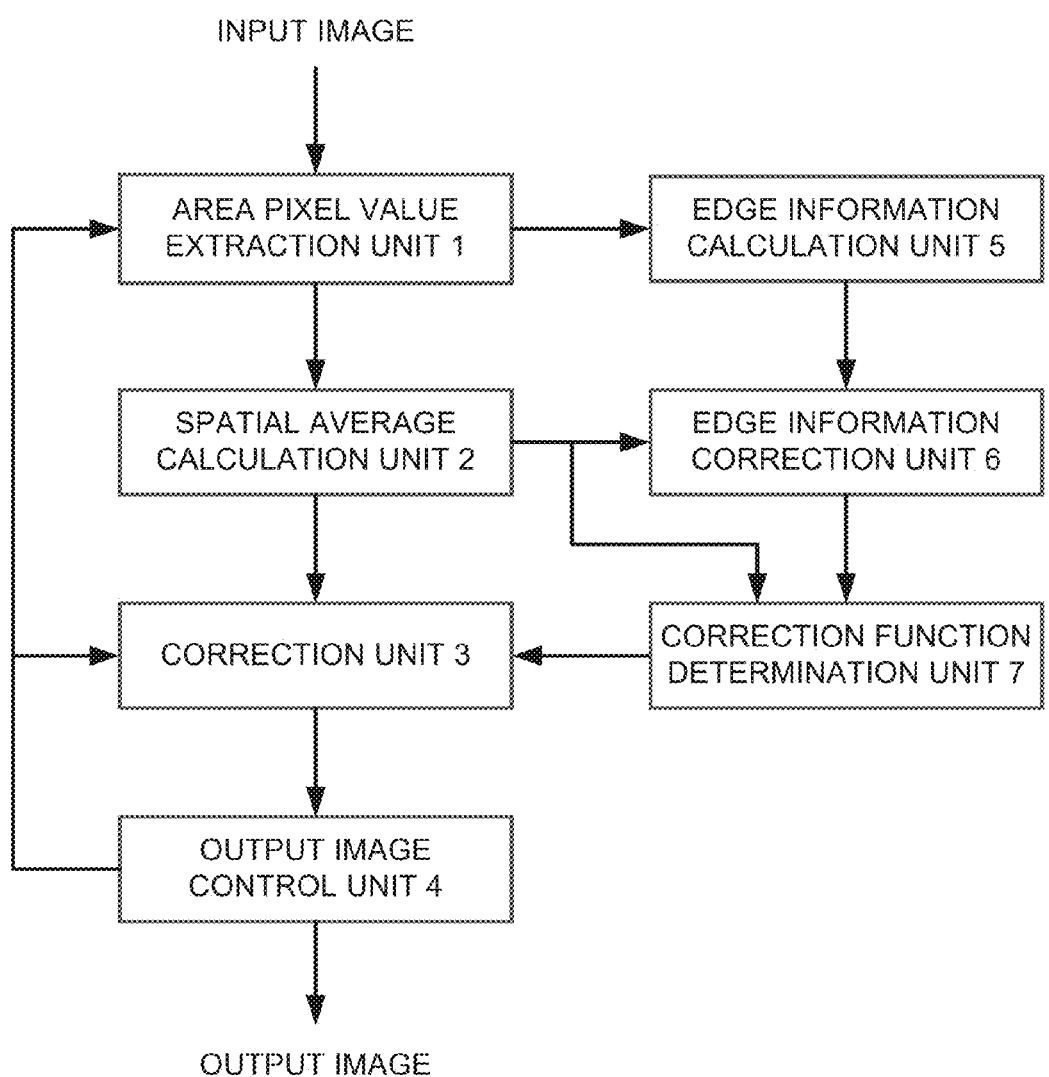
FIG. 7 is a block diagram illustrating an image processing device according to the second embodiment.

FIG. 7 is a block diagram illustrating an image processing device according to the second embodiment.

The image processing device according to the second embodiment includes the area pixel value extraction unit 1, the spatial average calculation unit 2, the correction unit 3, the output image control unit 4, the edge information calculation unit 5, the edge information correction unit 6, and a correction function calculation unit 7.

The area pixel value extraction unit 1, the spatial average calculation unit 2, the output image control unit 4, the edge information calculation unit 5, and the edge information correction unit 6 operate in the same manner as those of the image processing device according to the first embodiment.

The correction function calculation unit 7 calculates the parameter (a) in the Func function (correction function) according to the formula (12) and the formula (13) based on the post-correction edge amount calculated by the edge information correction unit 6 and the spatial average L4 (x, y) calculated by the spatial average calculation unit 2. Accordingly, the correction function calculation unit 7 calculates the Func function (correction function) of each layer.

The correction unit 3 corrects the spatial average of each layer using the Func function (correction function) of each corresponding layer calculated by the correction function calculation unit 7.

According to the second embodiment, the edge/flatness/texture determination based on the Weber's law is introduced, and thereby the pixel statistical values are sequentially corrected from the pixel statistical value in the area having wide-range to the pixel statistical value in the area having narrow-range. This ensures effective noise rejection not only for high frequency noise but also for low frequency noise.

According to the second embodiment, the edge/flatness/texture determination based on the Weber's law is introduced, and thereby the pixel statistical values are sequentially corrected from the pixel statistical value in the area having wide-range to the pixel statistical value in the area having narrow-range. This ensures effective noise rejection throughout from the high frequency noise to the low frequency noise without inviting blur of the edge and/or the texture.

Meanwhile, as apparent from the above description, it is possible to configure each unit with hardware, and it is also possible to achieve the same function with a computer program. In this case, a processor operated by a program that is stored in a program memory realizes a function and an operation equivalent to those of the above described embodiment. Alternatively, it is also possible to realize only a portion of the function of the above described embodiment by the computer program.

The above embodiments can be described partially or in whole according to the following supplementary notes. However, the present invention will not be limited to the following supplementary notes.

(Supplementary Note 1) An image processing method including:

calculating a pixel statistical value and edge information of pixels for each of areas of a multi-layer, the areas each containing a target pixel and having a successively decreased range;

correcting the edge information based on a pixel statistical value of an area that is wider than an area of a specific layer;

correcting difference information between a pixel statistical value of the area of the specific layer and the pixel statistical value of the area of a layer that is wider than the area of the specific layer using the post-correction edge information;

correcting the pixel statistical value of the area of the specific layer using post-correction difference information and the pixel statistical value of the area that is wider than the area of the specific layer; and correcting the target pixel by repeating correction of the pixel statistical value of the area of the specific layer successively in each layer until the area reduces its range from the maximum range to the minimum range.

(Supplementary note 2) The image processing method according to supplementary note 1, wherein the difference information is calculated using the pixel statistical value of the area of the specific layer, the pixel statistical value of the area of the layer that is wider than the area of the specific layer, and the post-correction edge information in the area of the layer that is wider than the area of the specific layer.

(Supplementary note 3) The image processing method according to supplementary note 1 or 2, wherein the pixel statistical value of the specific layer is not corrected in a case where the post-correction edge information in the area of the layer that is wider than the area of the specific layer exceeds a predetermined threshold.

(Supplementary note 4) The image processing method according to any one of supplementary notes 1 to 3, wherein a degree of correction is varied for each layer when the pixel statistical value of the area of the specific layer is corrected using the post-correction difference information and the pixel statistical value of the area that is wider than the area of the specific layer.

(Supplementary note 5) The image processing method according to supplementary note 4, wherein the degree of correction is varied according to a variation amount of the pixel value caused by noise of the area of the specific layer when the pixel statistical value of the area of the specific layer is corrected using the post-correction difference information and the pixel statistical value of the area that is wider than the area of the specific layer.

(Supplementary note 6) The image processing method according to supplementary note 4, wherein the degree of correction is varied according to a post-correction edge amount of the area that is wider than the area of the specific layer when the pixel statistical value of the area of the specific layer is corrected using the post-correction difference information and the pixel statistical value of the area that is wider than the area of the specific layer.

(Supplementary note 7) The image processing method according to any one of supplementary notes 1 to 6, wherein the correction is performed in such a manner that a value close to zero is output as the difference information comes closer to zero, whereas, the degree of correction is made smaller as the difference information becomes larger when the pixel statistical value of the area of the specific layer is corrected using the post-correction difference information and the pixel statistical value of the area that is wider than the area of the specific layer.

(Supplementary note 8) The image processing method according to any one of supplementary notes 1 to 7, wherein a spatial average value of pixels is used as the pixel statistical value.

(Supplementary note 9) The image processing method according to supplementary note 8, wherein the spatial average value is any one of an arithmetic mean, a geometric mean, or a weighted average efficiency of pixels.

(Supplementary note 10) An image processing device including:

a pixel statistical value calculation unit calculating a pixel statistical value of pixels for each of areas of a multi-layer, the areas each containing a target pixel and having a successively decreased range;

an edge information calculation unit calculating edge information for each of the areas of the multi-layer, the areas each containing a target pixel and having a successively decreased range;

an edge information correction unit correcting the edge information based on a pixel statistical value of an area that is wider than an area of a specific layer; and a correction unit correcting difference information between a pixel statistical value of the area of the specific layer and the pixel statistical value of the area of the layer that is wider than the area of the specific layer using post-correction edge information, correcting the pixel statistical value of the area of the specific layer using post-correction difference information and the pixel statistical value of the area that is wider than the area of the specific layer, and correcting the target pixel by repeating correction of the pixel statistical value of the area of the specific layer successively in each layer until the area reduces its range from the maximum range to the minimum range.

(Supplementary note 11) The image processing device according to supplementary note 10, wherein the correction unit calculates the difference information using the pixel statistical value of the area of the specific layer, the pixel statistical value of the area of the layer that is wider than the area of the specific layer, and the post-correction edge information in the area of the layer that is wider than the area of the specific layer.

(Supplementary note 12) The image processing device according to supplementary note 10 or 11, wherein the correction unit does not correct the pixel statistical value of the specific layer when the post-correction edge information in the area of the layer that is wider than the area of the specific layer exceeds a predetermined threshold.

(Supplementary note 13) The image processing device according to any one of supplementary notes 10 to 12, wherein the correction unit causes a degree of correction to vary for each layer when the pixel statistical value of the area of the specific layer is corrected using the post-correction difference information and the pixel statistical value of the area that is wider than the area of the specific layer.

(Supplementary note 14) The image processing device according to supplementary note 13, wherein the correction unit causes a degree of correction to vary according to a variation amount of pixel values caused by noise of the area of the specific layer when the pixel statistical value of the area of the specific layer is corrected using the post-correction difference information and the pixel statistical value of the area that is wider than the area of the specific layer.

(Supplementary note 15) The image processing device according to supplementary note 13, wherein the correction unit causes a degree of correction to vary according to the post-correction edge amount of the area that is wider than the area of the specific layer when the pixel statistical value of the area of the specific layer is corrected using the post-correction difference information and the pixel statistical value of the area that is wider than the area of the specific layer.

(Supplementary note 16) The image processing device according to any one of supplementary notes 10 to 15, wherein the correction unit performs correction in such a manner that a value close to zero is output as the difference information comes closer to zero, whereas, the degree of correction is made smaller as the difference information becomes larger, when the pixel statistical value of the area of the specific layer is corrected using the post-correction difference information and the pixel statistical value of the area that is wider than the area of the specific layer.

(Supplementary note 17) The image processing device according to any one of supplementary notes 10 to 16, wherein a spatial average of pixels is used as the pixel statistical value.

(Supplementary note 18) The image processing device according to supplementary note 17, wherein the spatial average value is any one of an arithmetic mean, a geometric mean, or a weighted average efficiency of pixels.

(Supplementary note 19) A program causing a computer to execute: pixel statistical value calculation processing for calculating a pixel statistical value of pixels for each of areas of a multi-layer, the areas each containing a target pixel and having a successively decreased range;

edge information calculation processing for calculating edge information for each of the areas of the multi-layer, the areas each containing a target pixel and having a successively decreased range;

edge information correction processing for correcting the edge information based on a pixel statistical value of an area that is wider than an area of a specific layer; and correction processing for correcting difference information between a pixel statistical value of the area of the specific layer and the pixel statistical value of the area of a layer that is wider than the area of the specific layer using the post-correction edge information, correcting the pixel statistical value of the area of the specific layer using the post-correction difference information and the pixel statistical value of the area that is wider than the area of the specific layer, and correcting the target pixel by repeating correction of the pixel statistical value of the area of the specific layer successively in each layer until the area reduces its range from the maximum range to the minimum range.

(Supplementary note 20) The program according to supplementary note 19, wherein, in the correction processing, the pixel statistical value of the area of the specific layer, the pixel statistical value of the area of the layer that is wider than the area of the specific layer, and the post-correction edge information of the area of the layer that is wider than the area of the specific layer are used to determine the difference information.

(Supplementary note 21) The program according to supplementary note 19 or 20, wherein, in the correction processing, correction of the pixel statistical value of the specific layer is not performed in a case where the post-correction edge information in the area of the layer that is wider than the area of the specific layer exceeds a predetermined threshold.

(Supplementary note 22) The program according to any one of supplementary notes 19 to 21, wherein, in the correction processing, a degree of correction is varied for each layer when the pixel statistical value of the area of the specific layer is corrected using the post-correction difference information and the pixel statistical value of the area that is wider than the area of the specific layer.

(Supplementary note 23) The program according to supplementary note 22, wherein, in the correction processing, a degree of correction is varied according to variation amounts of pixel values caused by noise in the area of the specific layer when the pixel statistical value of the area of the specific layer is corrected using the post-correction difference information and the pixel statistical value of the area that is wider than the area of the specific layer.

(Supplementary note 24) The program according to supplementary note 22, wherein, in the correction processing, a degree of correction is varied according to the corrected edge amount of the area that is wider than the area of the specific layer when the pixel statistical value of the area of the specific layer is corrected using the post-correction difference information and the pixel statistical value of the area that is wider than the area of the specific layer.

(Supplementary note 25) The program according to any one of supplementary notes 19 to 24, wherein, in the correction processing, correction is performed in such a manner that a value close to zero is output as the difference information comes closer to zero, whereas, the degree of correction is made smaller as the difference information becomes larger, when the pixel statistical value of the area of the specific layer is corrected using the post-correction difference information and the pixel statistical value of the area that is wider than the area of the specific layer.

(Supplementary note 26) The program according to any one of supplementary notes 19 to 25, wherein a spatial average of pixels is used as the pixel statistical value.

(Supplementary note 27) The program according to supplementary note 26, wherein the spatial average is any one of an arithmetic mean, a geometric mean, or a weighted average efficiency of pixels.

The present invention has been described above with reference to the preferred embodiments and examples. The present invention, however, is not always limited to the above embodiments and examples, but may be modified to be carried out in various forms without departing from the technical concept of the present invention.

This application claims the benefit of Japanese Application No. 2012-100909, filed Apr. 26, 2012, the disclosure of which is hereby incorporated by reference.

REFERENCE SIGNS LIST 1 area pixel value extraction unit
2 spatial average calculation unit
3 correction unit
4 output image control unit
5 edge information calculation unit
6 edge information correction unit
7 correction function calculation unit

The invention claimed is:

1. An image processing method comprising:
calculating a pixel statistical value and edge information of pixels for each of areas of a multi-layer, the areas each containing a target pixel and having a successively decreased range;
correcting the edge information based on a pixel statistical value of an area that is wider than an area of a specific layer;
correcting difference information between a pixel statistical value of the area of the specific layer and the pixel statistical value of the area of a layer that is wider than the area of the specific layer using the post-correction edge information;
correcting the pixel statistical value of the area of the specific layer using post-correction difference information and the pixel statistical value of the area that is wider than the area of the specific layer; and
correcting the target pixel by repeating correction of the pixel statistical value of the area of the specific layer successively in each layer until the area reduces its range from the maximum range to the minimum range.

2. The image processing method according to claim 1, wherein the difference information is calculated using the pixel statistical value of the area of the specific layer, the pixel statistical value of the area of the layer that is wider than the area of the specific layer, and the post-correction edge information in the area of the layer that is wider than the area of the specific layer.

3. The image processing method according to claim 1, wherein the pixel statistical value of the specific layer is not corrected in a case where the post-correction edge information in the area of the layer that is wider than the area of the specific layer exceeds a predetermined threshold.

4. The image processing method according to claim 1, wherein a degree of correction is varied for each layer when the pixel statistical value of the area of the specific layer is corrected using the post-correction difference information and the pixel statistical value of the area that is wider than the area of the specific layer.

5. The image processing method according to claim 4, wherein the degree of correction is varied according to a variation amount of the pixel value caused by noise of the area of the specific layer when the pixel statistical value of the area of the specific layer is corrected using the post-correction difference information and the pixel statistical value of the area that is wider than the area of the specific layer.

6. The image processing method according to claim 4, wherein the degree of correction is varied according to a post-correction edge amount of the area that is wider than the area of the specific layer when the pixel statistical value of the area of the specific layer is corrected using the post-correction difference information and the pixel statistical value of the area that is wider than the area of the specific layer.

7. The image processing method according to claim 1, wherein the correction is performed in such a manner that a value close to zero is output as the difference information comes closer to zero, whereas, the degree of correction is made smaller as the difference information becomes larger when the pixel statistical value of the area of the specific layer is corrected using the post-correction difference information and the pixel statistical value of the area that is wider than the area of the specific layer.

8. The image processing method according to claim 1, wherein a spatial average value of pixels is used as the pixel statistical value.

9. The image processing method according to claim 8, wherein the spatial average value is any one of an arithmetic mean, a geometric mean, or a weighted average efficiency of pixels.

10. An image processing device comprising:
a pixel statistical value calculation unit calculating a pixel statistical value of pixels for each of areas of a multi-layer, the areas each containing a target pixel and having a successively decreased range;
an edge information calculation unit calculating edge information for each of the areas of the multi-layer, the areas each containing a target pixel and having a successively decreased range;
an edge information correction unit correcting the edge information based on a pixel statistical value of an area that is wider than an area of a specific layer; and
a correction unit correcting difference information between a pixel statistical value of the area of the specific layer and the pixel statistical value of the area of a layer that is wider than the area of the specific layer using post-correction edge information, correcting the pixel statistical value of the area of the specific layer using post-correction difference information and the pixel statistical value of the area that is wider than the area of the specific layer, and correcting the target pixel by repeating correction of the pixel statistical value of the area of the specific layer successively in each layer until the area reduces its range from the maximum range to the minimum range.

11. The image processing device according to claim 10, wherein the correction unit calculates the difference information using the pixel statistical value of the area of the specific layer, the pixel statistical value of the area of the layer that is wider than the area of the specific layer, and the post-correction edge information in the area of the layer that is wider than the area of the specific layer.

12. The image processing device according to claim 10, wherein the correction unit does not correct the pixel statistical value of the specific layer when the post-correction edge information in the area of the layer that is wider than the area of the specific layer exceeds a predetermined threshold.

13. The image processing device according to claim 10, wherein the correction unit causes a degree of correction to vary for each layer when the pixel statistical value of the area of the specific layer is corrected using the post-correction difference information and the pixel statistical value of the area that is wider than the area of the specific layer.

14. The image processing device according to claim 13, wherein the correction unit causes a degree of correction to vary according to a variation amount of pixel values caused by noise of the area of the specific layer when the pixel statistical value of the area of the specific layer is corrected using the post-correction difference information and the pixel statistical value of the area that is wider than the area of the specific layer.

15. The image processing device according to claim 13, wherein the correction unit causes a degree of correction to vary according to the post-correction edge amount of the area that is wider than the area of the specific layer when the pixel statistical value of the area of the specific layer is corrected using the post-correction difference information and the pixel statistical value of the area that is wider than the area of the specific layer.

16. The image processing device according to claim 10, wherein the correction unit performs correction in such a manner that a value close to zero is output as the difference information comes closer to zero, whereas, the degree of correction is made smaller as the difference information becomes larger, when the pixel statistical value of the area of the specific layer is corrected using the post-correction difference information and the pixel statistical value of the area that is wider than the area of the specific layer.

17. The image processing device according to claim 10, wherein a spatial average of pixels is used as the pixel statistical value.

18. The image processing device according to claim 17, wherein the spatial average value is any one of an arithmetic mean, a geometric mean, or a weighted average efficiency of pixels.

19. A non-transitory computer readable storage medium storing a program causing a computer to execute:
  pixel statistical value calculation processing for calculating a pixel statistical value of pixels for each of areas of a multi-layer, the areas each containing a target pixel and having a successively decreased range;
  edge information calculation processing for calculating edge information for each of the areas of the multi-layer, the areas each containing a target pixel and having a successively decreased range;
  edge information correction processing for correcting the edge information based on a pixel statistical value of an area that is wider than an area of a specific layer; and
  correction processing for correcting difference information between a pixel statistical value of the area of the specific layer and the pixel statistical value of the area of a layer that is wider than the area of the specific layer using the post-correction edge information, correcting the pixel statistical value of the area of the specific layer using the post-correction difference information and the pixel statistical value of the area that is wider than the area of the specific layer, and correcting the target pixel by repeating correction of the pixel statistical value of the area of the specific layer successively in each layer until the area reduces its range from the maximum range to the minimum range.

* * * * *